United States Patent [19]

Moriwake et al.

[11] Patent Number: 5,751,864
[45] Date of Patent: May 12, 1998

[54] IMAGE DATA PROCESSING APPARATUS

[75] Inventors: Katsuakira Moriwake, Kanagawa; Toshihiro Shiraishi, Kangawa, both of Japan

[73] Assignee: Sony Corporation, Tokyo, Japan

[21] Appl. No.: 701,004

[22] Filed: Aug. 21, 1996

Related U.S. Application Data

[63] Continuation of Ser. No. 302,370, Sep. 8, 1994, abandoned.

[30] Foreign Application Priority Data

Sep. 8, 1993 [JP] Japan .................. 5-223517

[51] Int. Cl.$^6$ .................. G06K 9/36
[52] U.S. Cl. .................. 382/276; 382/270; 382/293; 348/239; 348/578
[58] Field of Search .................. 382/270, 275, 382/293, 276; 348/239, 411, 572, 578, 588; 364/252.1; 342/185; 395/800

[56] References Cited

U.S. PATENT DOCUMENTS

| | | | |
|---|---|---|---|
| 4,616,319 | 10/1986 | Peters et al. | 364/413.13 |
| 4,622,589 | 11/1986 | Bell | 358/183 |
| 4,734,770 | 3/1988 | Matsuba | 382/275 |
| 4,829,308 | 5/1989 | Tol et al. | 342/185 |
| 4,965,844 | 10/1990 | Oka et al. | 382/293 |
| 5,070,465 | 12/1991 | Kato et al. | 395/141 |
| 5,150,428 | 9/1992 | Leone et al. | 382/270 |
| 5,155,852 | 10/1992 | Murakami et al. | 395/650 |
| 5,225,824 | 7/1993 | Yamamoto et al. | 340/799 |
| 5,235,423 | 8/1993 | Dunbar et al. | 348/578 |
| 5,325,448 | 6/1994 | Katayama et al. | 382/270 |

FOREIGN PATENT DOCUMENTS 0 437 074  7/1991  European Pat. Off. ........ G06F 15/62

*Primary Examiner*—David K. Moore
*Assistant Examiner*—Anh Hong Do
*Attorney, Agent, or Firm*—Frommer Lawrence & Haug LLP; William S. Frommer

[57] ABSTRACT

An image data processing apparatus for adding a special effect to an input image data, which is provided with function data generating means for generating function data in accordance with positions of pixel data for each pixel data forming the image data, random number generating means for generating different random numbers for each pixel data, and output means for judging based on the function data and the random number data if the corresponding pixel data is valid data or invalid data, outputting the pixel data only when valid data.

6 Claims, 7 Drawing Sheets

LINEAR FUNCTION

NON-LINEAR FUNCTION (a : REDUCED PORTION,
 b : EXPANED PORTION)

IMAGE DATA PROCESSING APPARATUS

This application is a continuation of application Ser. No. 08/302,370, filed Sep. 8, 1994, now abandoned.

BACKGROUND OF THE INVENTION

1. Field of the Invention

The present invention relates to an image data processing apparatus which can add special effects to image data.

2. Description of the Related Art

In the past, there have been known many image data processing apparatuses which can give various special effects to image data.

These image data processing apparatuses have performed image processing by the following method:

First, digital image data input from a VTR etc. is successively stored in a frame memory in accordance with addresses generated from a write address generating circuit.

The image data stored in the frame memory is successively read out in a predetermined order in accordance with addresses generated from a read address generating circuit and then the read image data is subjected to the required processing.

Such an image data processing apparatus, is disclosed in U.S. Pat. No. 5,070,465 for example.

However, in such image data processing apparatuses, here is further required to provide new special effects ever before seen.

SUMMARY OF THE INVENTION

An object of the present invention is to provide an image data processing apparatus which can give a specific pixel density to an image in accordance with a probability function.

More specifically, the present invention relates to an image data processing apparatus for adding a special effect to input image data, and there is provided with the image data processing apparatus including: a function data generating means for generating function data in accordance with positions of pixel data for each pixel data forming the image data, a random number generating means for generating different random numbers for each pixel data, and an output means for judging based on the function data and the random number data if a corresponding pixel data is valid data or invalid data, and outputting the pixel data only when valid data.

BRIEF DESCRIPTION OF THE DRAWINGS

The above and other objects and features of the present invention will be more apparent from the following description of the preferred embodiments with reference to the accompanying drawings, wherein:

FIGS. 3A and 3B are views illustrating the effect on an image by the density adjusting circuit shown in FIG. 1, wherein FIG. 3A shows the image given the special effect based on the function values shown in FIG. 3B and FIG. 3B shows the function values set in the table RAM.

FIGS. 7A and 7B are views illustrating the effect on an image by the read address changing circuit shown in FIG. 1, wherein FIG. 7A shows the image obtained in the case of making the positions of the pixels of the original image and the positions of the pixels of the processed image a linear function in the X-axial direction and FIG. 7B shows the image obtained in the case of making the positions of the pixels of the original image and the positions of the pixels of the processed image a non-linear function in the X-axial direction.

DESCRIPTION OF THE PREFERRED EMBODIMENTS

A first embodiment of the present invention will be explained.

The image data processing apparatus 1 realizes a special pixel effect giving a change in position to image data for each pixel in accordance with a probability function and a special density effect giving any change in pixel density to different portions of an image—either both at the same time or else one of the two.

Figure 1:
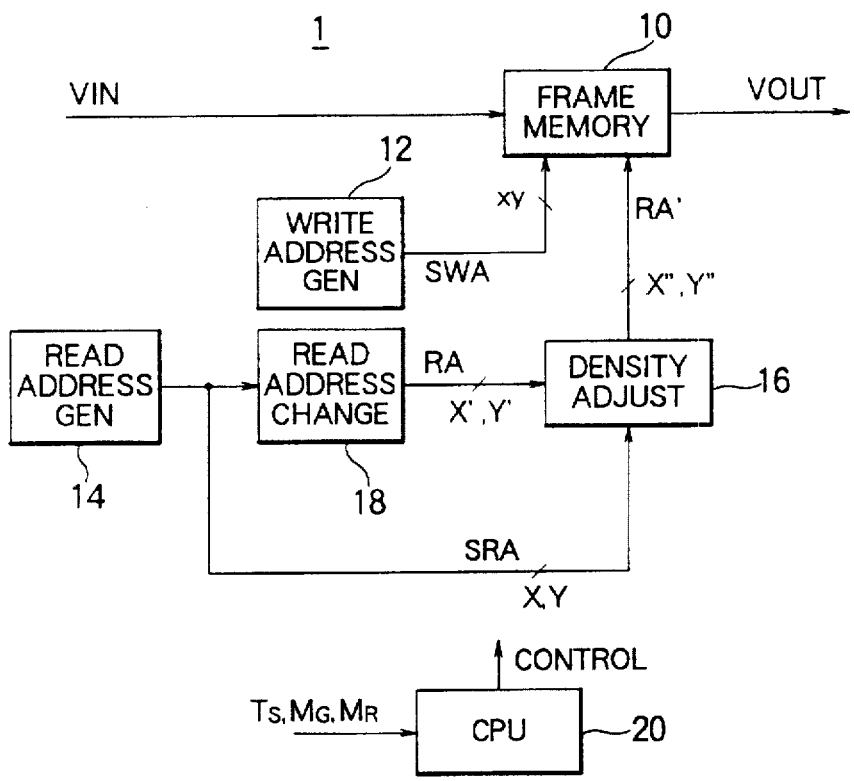
FIG. 1 is a view of the configuration of an image data processing apparatus of the present invention.

FIG. 1 is a view of the configuration of an image data processing apparatus 1 of the present invention.

Below, as an example, an explanation will be made of the case of a bit width of the image data handled by the image data processing apparatus 1 of 8 bits.

In FIG. 1, the frame memory 10 stores in a predetermined two-dimensional array the input image data VIN input from a digital VTR etc. (not shown) connected to the image data processing apparatus 1 in units of frames, in particular, the pixel values of the pixels, for example, the luminance signals and the chrominance signals.

The array of the image data in the frame memory 10 corresponds to the positions of the pixels on the image.

The frame memory 10 outputs the image data corresponding to the read addresses RA' input from the density adjusting circuit 16 as the output image data VOUT.

The write address generating circuit 12 generates sequential write addresses SWA for use for writing the image data in the frame memory 10 and inputs them in the frame memory 10.

Note that write addresses are generated for each pixel in a predetermined order from the write address generating circuit 12 and that the pixel values of the image data are successively stored at the addresses designated by the write addresses.

The read address generating circuit 14 generates read addresses SRA in the same order as the write addresses SWA generated by the write address generating circuit 12 for example and inputs them into the density adjusting circuit 16 and read address changing circuit 18.

The density adjusting circuit 16 performs processing based on the addresses SRA input from the read address generating circuit 14 and the addresses RA input from the read address changing circuit 18, validates predetermined addresses among the addresses RA, invalidates the others, and inputs these as the addresses RA' into the frame memory 10.

The configuration and operation of the density adjusting circuit 16 will be explained later with reference to FIG. 2.

The read address changing circuit 18 makes predetermined changes to the read addresses generated by the read address generating circuit 14 and inputs the results to the density adjusting circuit 16.

The configuration and operation of the read address changing circuit 18 will be explained later with reference to FIG. 4.

A central processing unit (CPU) 20 sets the parameters for use in processing of the different portions of the image data processing apparatus 1 and controls the image data processing apparatus 1 as a whole.

Equivalent functions of the different portions of the image data processing apparatus 1 mentioned above may be realized by hardware or may be realized by software in a computer.

Figure 2:
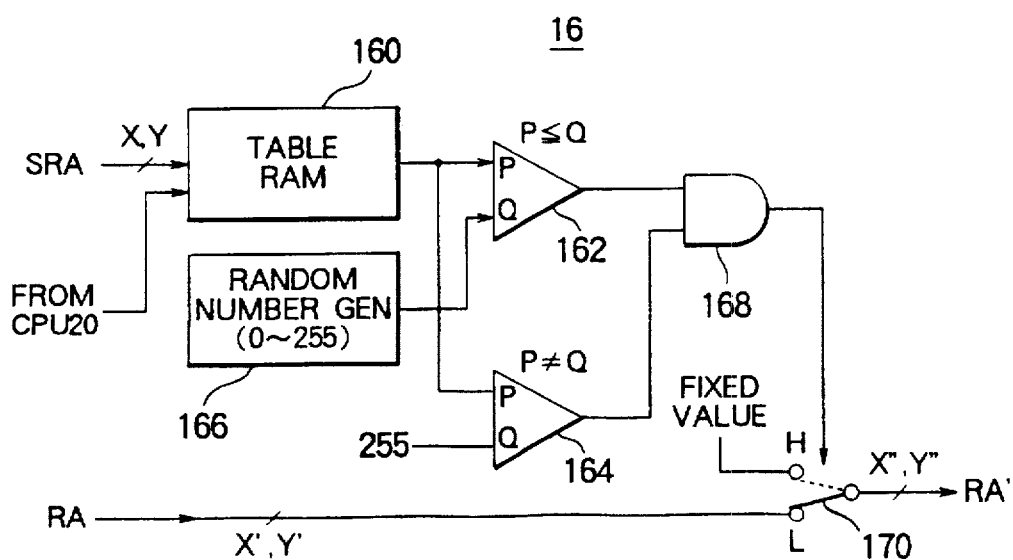
FIG. 2 is a view of the configuration of the density adjusting circuit shown in FIG. 1.

FIG. 2 is a view of the configuration of the density adjusting circuit 16 shown in FIG. 1.

Note that the density adjusting circuit 16 processes two-dimensional addresses RA (X', Y') and addresses SRA (x, y) and generates two-dimensional addresses RA' (X", Y"), but is illustrated as one which processes one-dimensional addresses for simplification of the illustration.

A table random access memory (RAM) 160 is set by the CPU 20 and stores function values corresponding to the addresses SRA input from the read address generating circuit 14.

The function values stored in the table RAM 160 are read out each time addresses SRA corresponding to the function values are input to the table RAM 160 and are input to each of the input terminals P of the comparison circuits 162 and 164.

The comparison circuit 162 compares the function values from the table RAM 160 input to its P-terminal and the random numbers from the random number generating circuit 166 input to its Q-terminal, outputs logical values 1 when for example the function values are equal to or smaller than the values of the random numbers (P≦Q), outputs the logical values 0 in other cases, and inputs the same in an AND circuit 168.

The comparison circuit 164 compares the function values from the table RAM 160 input to its P-terminal and fixed values, for example 255, input to its Q-terminal, outputs logical values 1 when for example the function values are not equal to 255 (P≠Q), outputs the logical values 0 in other cases, and inputs the same in the AND circuit 168. Note that by provision of this comparison circuit 164, it is possible to make the probability of disappearance of a pixel "0". That is, this means that it is possible to make this effect be performed.

The AND circuit 168 takes the logical AND of the logical values input from the comparison circuits 162 and 164 and outputs the results.

The random number generating circuit 166 generates the numbers 0 to 255 with the same probability.

A switch circuit 170 selects the H-side contact and invalidates addresses RA when the output of the AND circuit 168 is the logical value 1 and, for example, outputs all 1 (numeral 255) for X' and Y' as the addresses RA' and selects the L-side contact and validates addresses RA when the logical value is 0 and outputs the same as the are as the addresses RA'.

The pixel values of the pixels corresponding to the validated addresses RA are effectively output from the frame memory 10, but the pixel values of the pixels corresponding to the invalidated addresses RA are not output from the frame memory 10 and become invalid.

Accordingly, even if the output image signal VOUT is displayed, the invalid pixel values are not shown. The portions with large numbers of invalid pixel values on an image are perceived by observers as being lighter.

The probability that addresses RA will be validated is based on function values stored in the table RAM 160 corresponding to addresses SRA as shown in the following table:

TABLE 1

| Function value | Range of random numbers giving P < Q | Output of P ≠ Q | Probability of disappearance of pixel |
|---|---|---|---|
| 0 | 0 to 255 | 1 | 256/256 |
| 1 | 1 to 255 | 1 | 255/256 |
| . | . | . | . |
| . | . | . | . |
| . | . | . | . |
| 254 | 254, 255 | 1 | 2/256 |
| 255 | 255 | 0 | 0/256 |

Note: Except when the function value is 255, it is assumed that all pixels are not extinguished.

By changing the function values from the CPU 20, it is possible to invalidate the output image data VOUT of the frame memory 10 in units of pixels with any probability at any position on the image and possible to give changes in the pixel density to the image.

Figure 3A:
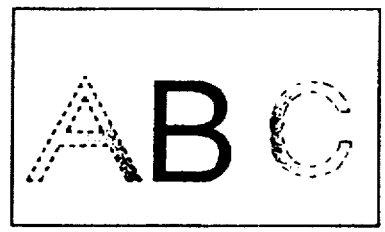
Figure 3B:
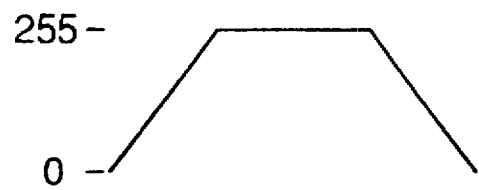

FIGS. 3A and 3B are views illustrating the effect on an image by the density adjusting circuit 16 shown in FIG. 1.

FIG. 3A shows an image given the special effect based on the function values shown in FIG. 3B, and FIG. 3B shows the function values set in the table RAM 160.

Functional values shown in FIG. 3B are set in the table RAM 160 for each row in the X-axial direction of the image. When processing image data showing the letters "ABC" by the density adjusting circuit 16, it is possible to obtain an image of the letters "ABC" wherein the density becomes lower at the two ends of the image as shown by FIG. 3A (becomes lighter).

Figure 4:
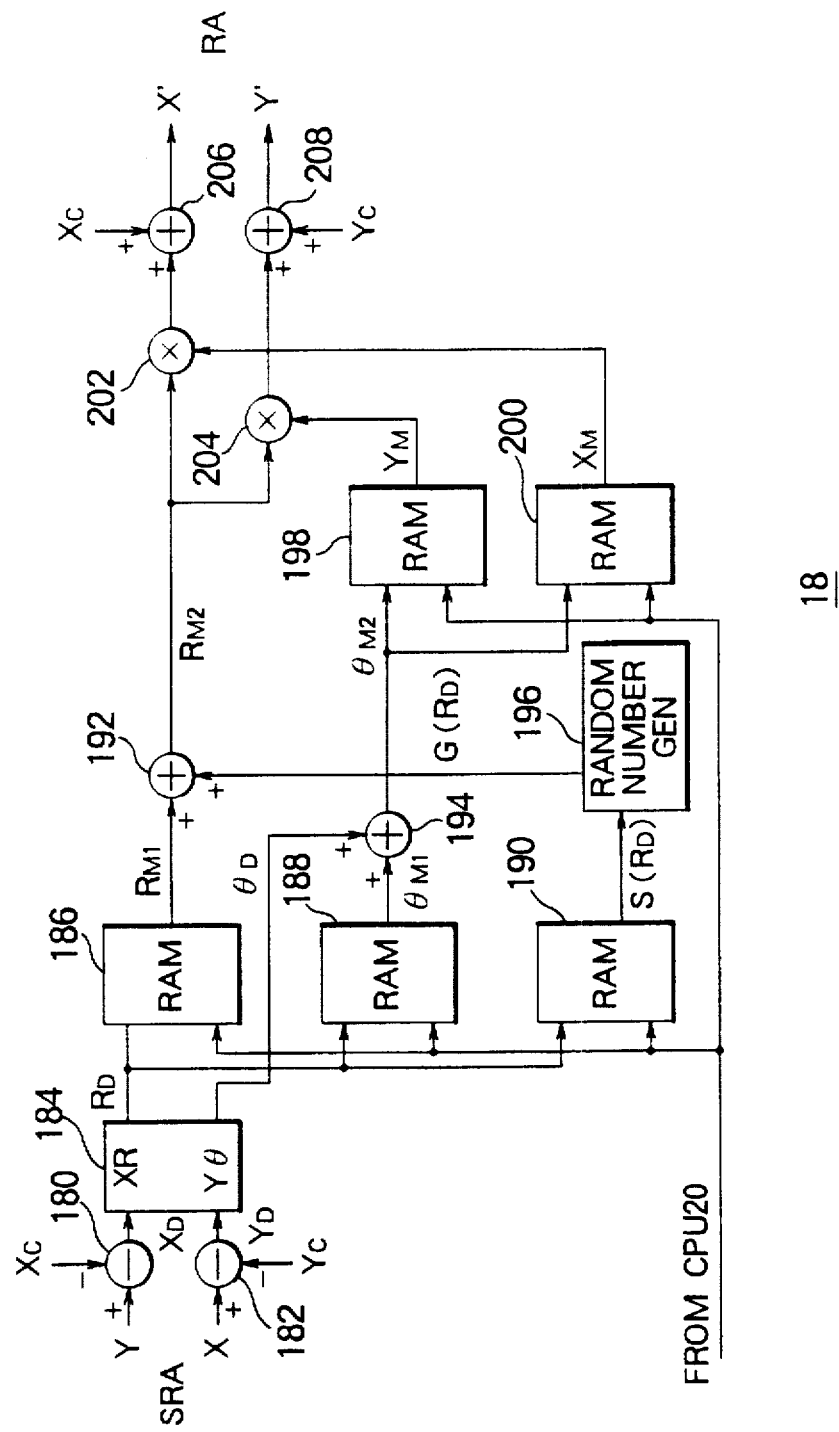
FIG. 4 is a view of the configuration of the read address changing circuit shown in FIG. 1.

FIG. 4 is a view of the configuration of the read address changing circuit 18 shown in FIG. 1.

The read address changing circuit 18 converts the addresses SRA (X, Y) to polar coordinates having any coordinates ($X_c$, $Y_c$) as their origin and applies weighing based on random numbers to generate the addresses RA (X', Y').

When reading out and reproducing image data from the frame memory 10 in accordance with the addresses RA, it is possible to give to the image data a special effect appearing to the viewer that the original image has exploded around the coordinates ($X_c$, $Y_c$).

In FIG. 4, subtraction circuits 180 and 182 subtract the center coordinates ($X_c$, $Y_c$) of the polar coordinates from the addresses SRA (X, Y) input from the read address generating circuit 14 and input the results to the coordinate changing circuit 184 as the coordinates ($X_D$, $Y_D$).

The coordinate changing circuit 184 converts the coordinates ($X_D$, $Y_D$) to polar coordinates and inputs the results to the table RAM's 186, 188, and 190 as the polar coordinates ($R_D$, $\theta_D$).

The distance $R_D$ in the polar coordinates ($R_D$, $\theta_D$) is calculated by the following equation:

$$R_D = \sqrt{X_D{}^2 + Y_D{}^2} = \sqrt{(X-X_C)^2 + (Y-Y_C)^2} \quad (1)$$

The table RAM 186 stores the numerical values $R_{M1}$ is found by the CPU 20 based on the amount of explosion $T_s$ and the amount of dispersion of the explosion $M_G$ and corresponding to the values of the distances $R_D$ set in the table RAM 186 and inputs the numerical values $R_{M1}$ corresponding to the distances $R_D$ input from the coordinate converting circuit 184 to the addition circuit 192.

The relationship between the distances $R_D$ and the numerical values $R_{M1}$, is shown by the following equation:

$$R_{M1} = F(R_D) \quad (2)$$

Figure 5:
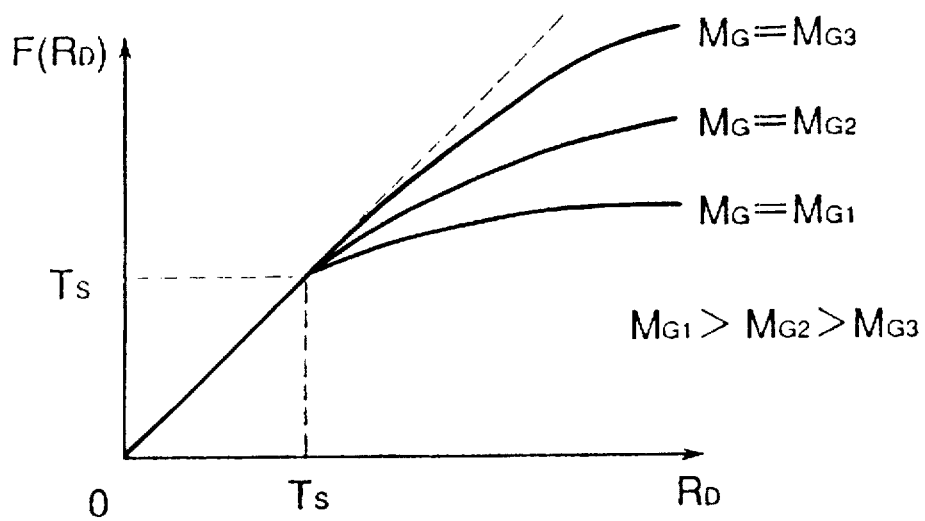
FIG. 5 is a graph of the function $F(R_D)$ shown in equation 2.

FIG. 5 is a graph of the function $F(R_D)$ shown in equation 2.

The function $F(R_D)$ shown in equation 2, as shown in FIG. 5, is a function in which the inclination of the tangent (first-order differentiation coefficient) decreases along with an increase of the distance from the origin.

The table RAM 188 stores the values $\theta_{M1}$ corresponding to the values of the distance $R_D$ set by the CPU 20 and inputs to the addition circuit 194 the numerical values $\theta_{M1}$ corresponding to the distances $R_D$ input from the coordinate changing circuit 184.

By changing the numerical values $\theta_{M1}$ in accordance with the distances, the image obtained by reproduction of the image data converted by the image data processing apparatus 1 can be given a special effect appearing to the viewer as if for example it is swirling.

In this embodiment, no change is made in the angles $\theta_D$ in accordance with the distances $R_D$ for simplification of the explanation.

That is, the relationship between the angles $\theta_D$ and the numerical values $\theta_{M1}$ is made as in the following equation so that the object in the image after linear explosion appears to the viewer to linearly fly from the center coordinates ($X_c$, $Y_c$).

Accordingly, all the numerical values stored in the table RAM 186 become 0.

$$\theta_{M1} = \theta_D \quad (3)$$

The table RAM 190 stores the numerical values $S(R_D)$ corresponding to the values of the numerical values $R_D$ found based on the random values $M_R$ and set in the table RAM 190 by the CPU 20, outputs the numerical value amounts $S(R_D)$ used for the restriction of the random numbers corresponding to the distances $R_D$ input from the coordinate converting circuit 184, and inputs the same to the table RAM 190.

The random number generating circuit 196 generates random numbers $G(R_D)$ in the range of the numeral values $S(R_D)$ input from the table RAM 190 and inputs them to the addition circuit 192.

Figure 6:
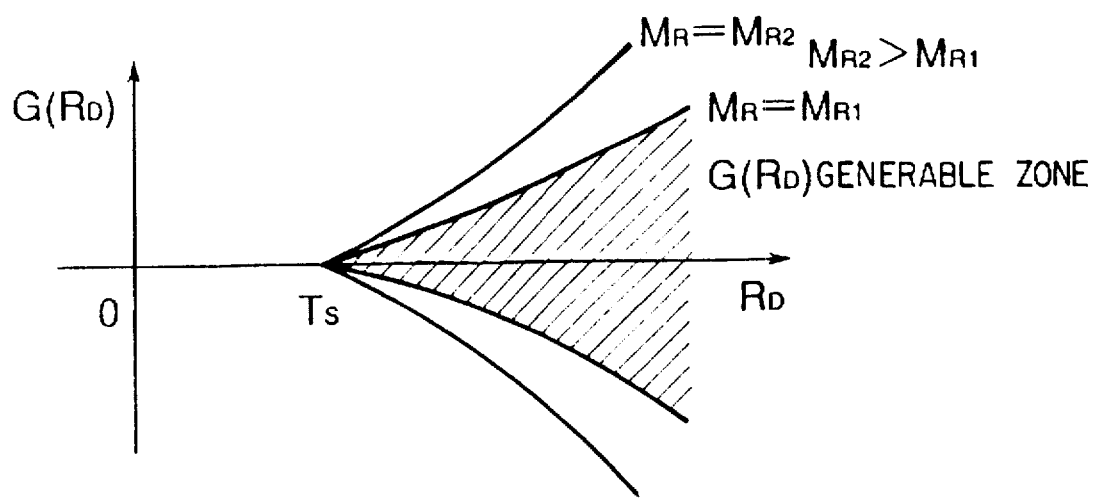
FIG. 6 is a view explaining the values of the random numbers $G(R_D)$.

FIG. 6 is a view explaining the values of the random numbers $G(R_D)$.

The larger the numerical values $M_R$, the larger the numerical values $S(R_D)$ found in the CPU 20 and stored in the table RAM 190.

For example, the random numbers $G(R_D)$ in the case where the numerical figure $M_R = M_{R1}$ is generated at random in the range shown by the hatching in FIG. 6.

Further, as will be understood by referring to FIG. 5 and FIG. 6, when the distance $R_D$ is less than the amount of explosion $T_s$, $F(R_D) = R_D$ and the value of the random number $G(R_D)$ becomes 0.

However, the above function $F(R_D)$ and numerical values $S(R_D)$ are illustrations. Various values can be used in accordance with the application of the image data processing apparatus 1.

The addition circuit 192 adds the numerical figures $R_{M1}$ and random numbers $G(R_D)$ and inputs the results as the numerical figures $R_{M2}$ to the multiplication circuits 202 and 204.

The computation in the addition circuit 192 is expressed by the following equation:

$$R_{M2} = R_{M1} + G(R_D) \quad (4)$$

The addition circuit 194 adds the angles $\theta_D$ and the numerical figures $\theta_{M1}$ and inputs the result as the numerical figures $\theta_{M2}$ to the RAM's 198 and 200.

The computation in the addition circuit 194 is expressed by the following equation:

$$\theta_{M2} = \theta_{M1} \theta_d \quad (5)$$

The RAM 198 stores the numerical figures $Y_M$ found by the CPU 20 in accordance with the numerical FIGS. $\theta_{M2}$ and inputs the numerical figures $Y_M$ corresponding to the numerical figures $\theta_{M2}$ input from the addition circuit 194 to the multiplication circuit 204.

The RAM 200 stores the numerical figures $X_M$ found by the CPU 20 in accordance with the numerical figures $\theta_{M2}$ and inputs the numerical figures $X_M$ corresponding to the numerical figures $\theta_{M2}$ input from the addition circuit 194 to the multiplication circuit 202.

The numerical figures $X_M$ are defined by the following equation:

$$\begin{aligned} X_M &= R_{M2} \times \cos\theta_D \\ &= (F(R_D) + G(R_D)) \times \cos\theta_D \end{aligned}$$

The multiplication circuits 202 and 204 multiply the numerical figures $R_{M2}$ and numerical figures $X_M$ and the numerical figures $R_{M2}$ and numerical figures $Y_M$ input to the same and input the results to the addition circuits 206 and 208.

The addition circuits 206 and 208 add to the input signals from the multiplication circuits 202 and 204 the center coordinates subtracted by the subtraction circuits 180 and 182 and outputs the results as the addresses RA (numerals (X', Y')).

The addresses RA are defined by the following equations:

$$X' = X_M + X_c = R_{M2} \times \cos\theta_D + X_c = (F(R_D) + G(R_D)) \times \cos\theta_D + X_c \quad (6)$$

$$Y' = Y_M + Y_c = R_{M2} \times \sin\theta_D + Y_c = (F(R_D) + G(R_D)) \times \sin\theta_D + Y_c \quad (7)$$

Note that the read address changing circuit 18 stops the operation of the coordinate changing circuit 184, passes the addresses SRA as they are, and changes the content of the table RAM's 186, 188, and 190 and the RAM's 198 and 200 whereby it is possible to give not only a special effect reminiscent of an explosion about certain coordinates, but also a special effect of simple enlargement of the image or enlargement in just the X-axial direction or Y-direction.

Further, by just the operation of setting the numerals $T_s$, $M_G$, and $M_R$ in the CPU 20 so as to cause the CPU 20 to automatically generate the numerical figures $R_{M1}$, $\theta_{M1}$, $S(R_D)$, $X_M$, and $Y_M$ and set them in the table RAM's 186, 188, and 190 and the RAM's 198 and 200, the operation of the image data processing apparatus 1 can be made easier for the user.

That is, the user of the image data processing apparatus 1 can increase the range in which the object in the image is not changed by just setting the value of the amount of explosion $T_s$ large. By just setting the amount of dispersion of the explosion $M_G$ large, it is possible to obtain an image in which it appears the object has been dispersed by an explosion. Further, by making the random numbers $M_R$ larger, it is possible to obtain an image in which it appears the object has been dispersed wildly by an explosion.

When the user sets the numerical figures small in the CPU 20, the above effects on the image become opposite.

Figure 7A:
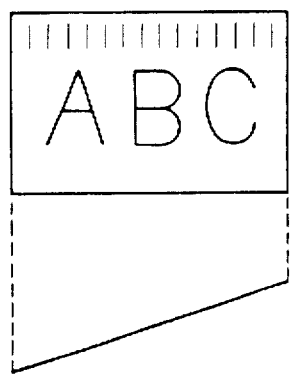
Figure 7B:
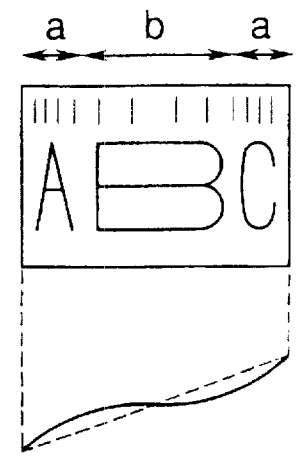

FIGS. 7A and 7B are views illustrating the effect on an image by the read address changing circuit 18 shown in FIG. 1.

FIG. 7A shows the image obtained in the case of making the positions of the pixels of the original image and the positions of the pixels of the processed image a linear function in the X-axial direction and FIG. 7B shows the image obtained in the case of making the positions of the pixels of the original image and the positions of the pixels of the processed image a non-linear function in the X-axial direction.

Note that for simplification of the illustration in FIG. 7, the case is shown of modification of the image in just the X-axial direction.

The positions of the pixels of the image of the letters "ABC" are changed in any fashion by setting the read address changing circuit 18 through the CPU 20.

Below, an explanation will be made of the operation of the image data processing apparatus 1.

The user of the image data processing apparatus 1 first sets the amount of explosion $T_s$, the amount of dispersion of the explosion $M_G$, and the random values $M_R$ in the CPU 20.

First, the CPU 20 computes and stores in the table RAM's 186, 188, and 189 and the RAM's 198 and 200 the numerical figures $R_{M1}$, $\theta_{M1}$, $S(R_D)$, $X_M$, and $Y_M$ based on these numerical figures.

Next, the image data VIN is stored at predetermined addresses in a predetermined array in one frame's worth of the frame memory 10 based on the write addresses SWA generated by the write address generating circuit 12.

When the writing of the image data in the frame memory 10 ends, the read address generating circuit 14 generates read addresses SRA in the same order as the write addresses SWA generated by the write address generating circuit 12.

The read address changing circuit 18 makes the above-mentioned changes in the read addresses generated by the read address generating circuit 14.

The density adjusting circuit 16 processes the addresses SRA and the addresses RA input from the read address changing circuit 18 to validate predetermined addresses RA and invalidate the others.

The image data stored in the frame memory is read out in accordance with the addresses RA' generated by the change by the read address changing circuit 18 and the density adjusting circuit 16 and validated or invalidated for each pixel.

By the above operation, the image data is changed for each pixel based on random numbers.

Figure 8:
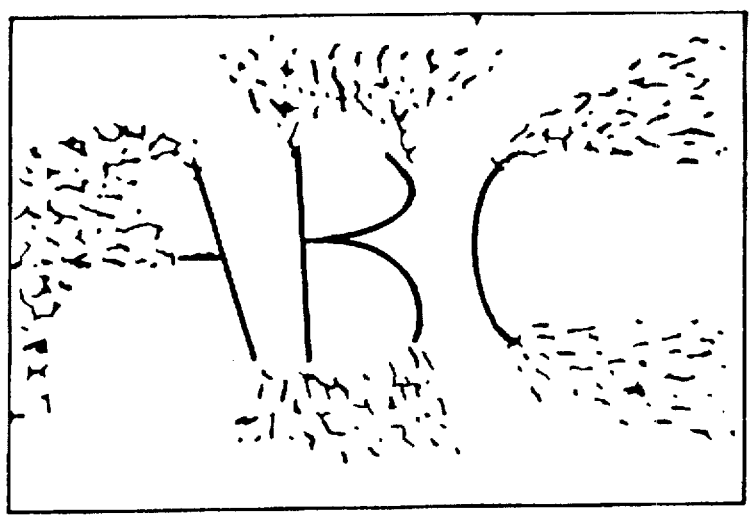
FIG. 8 is a view illustrating the image data given a special effect by the image data processing apparatus of the present invention.

FIG. 8 is a view illustrating the image data given a special effect by the image data processing apparatus of the present invention.

When changing the image of the letters "ABC" by the read address changing circuit 18 to make it seem to explode and changing it by the density adjusting circuit 16 to give changes in the pixel density, it is possible to obtain an image of the letters "ABC" which seems to be dispersed in a radial manner from predetermined center coordinates and having a sparser (light) density of pixels the greater the distance from the center coordinates.

Below, an explanation will be made of the processing in the density adjusting circuit 16 and the read address changing circuit 18 referring to the flow chart.

Figure 9:
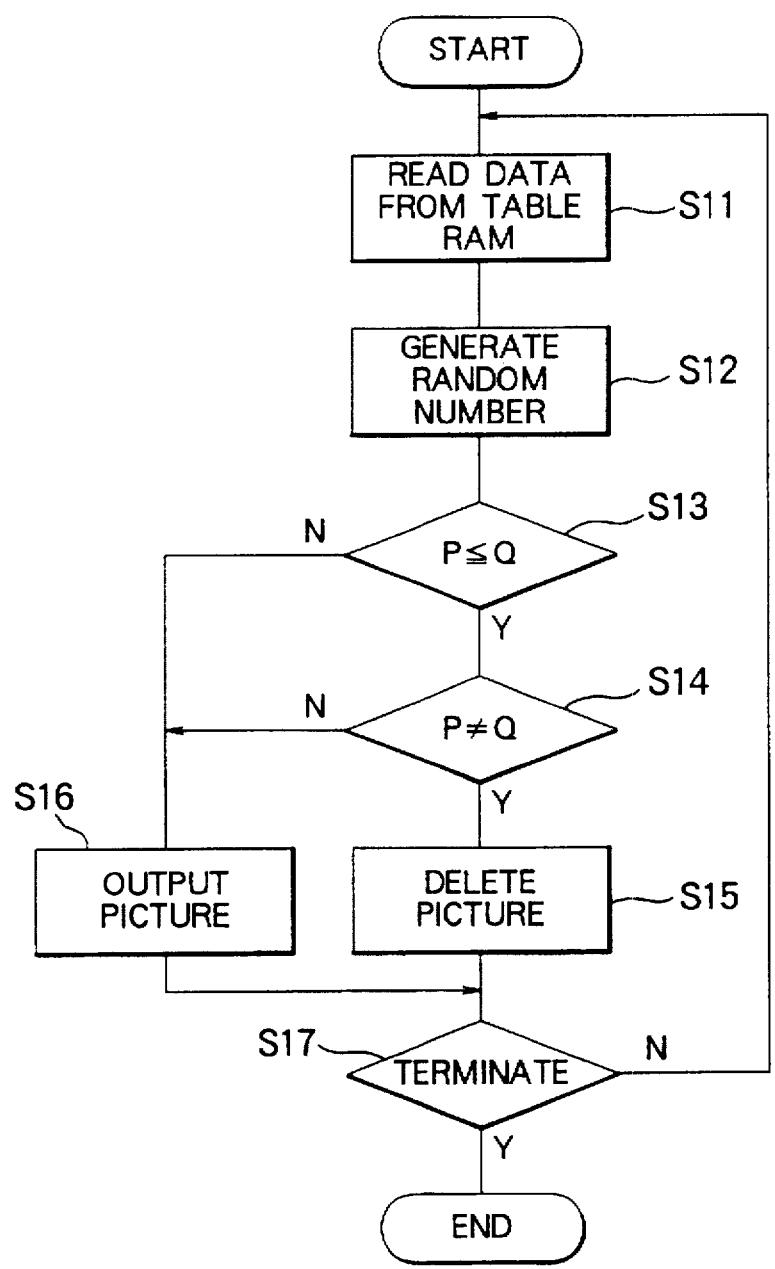
FIG. 9 is a flow chart of the processing of the density adjusting circuit shown in FIG. 1.

FIG. 9 is a flow chart of the processing of the density adjusting circuit shown in FIG. 1.

In FIG. 9, at step 11 (S11), the function value is read from the table RAM 160.

At step 12 (S12), a random number is generated from the random number generating circuit 166.

At step 13 (S13), the comparison circuit 162 compares the function value read from the table RAM 160 and the value of the random number generated by the random number generating circuit 166 and judges if the function value is less than the value of the random number.

When less than the value of the random number, the routine proceeds to step 14, while when it is above the value of the random number, the routine proceeds to the processing of step 16.

At step 14 (S14), the comparison circuit 164 compares the function value and fixed value (255) and judges if the function value is 255.

When the function value is not 255, the routine proceeds to the processing of step 15, while when the function value is 255, the routine proceeds to the processing of step 16.

At step 16 (S16), the density adjusting circuit 16 validates the address RA input from the read address changing circuit 18 (outputs figure).

At step 15 (S15), the density adjusting circuit 16 invalidates the address RA input from the read address changing circuit 18 (erases figure).

Figure 10:
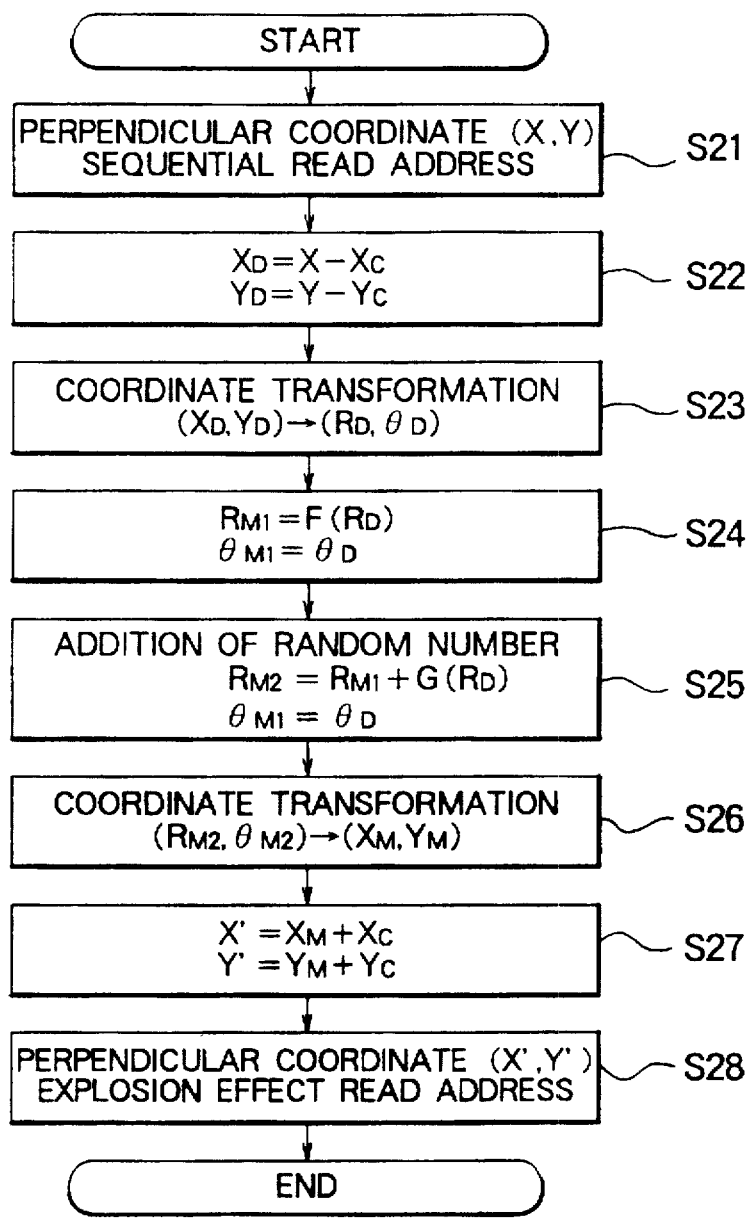
FIG. 10 is a flow chart of the processing of the read address generating circuit and read address changing circuit shown in FIG. 1 and the frame memory.

FIG. 10 is a flow chart of the processing of the read address generating circuit 14 and read address changing circuit 18 shown in FIG. 1 and the frame memory 10.

In FIG. 10, at step 21 (S21), the read address generating circuit 14 generates addresses SRA (orthogonal coordinate (X, Y) sequential addresses).

At step 22 (S22), the subtraction circuits 180 and 182 subtract the numerals $X_c$ and $Y_c$.

At step 23 (S23), the coordinate changing circuit 184 changes the coordinates.

At step 24 (S24), the table RAM 186 outputs the numerical figures $R_{M1}$ and the table RAM 188 outputs the numerical figures $\theta_{M2}$.

At step 25 (S25), the addition circuits 192 and 194 calculate the numerical figures $R_{M2}$ and $\theta_{M2}$.

At step 26 (S26), the RAM's 198 and 200 convert the coordinates and calculate the numerical figures $X_M$ and $Y_M$.

At step 27 (S27), the addition circuits 206 and 208 calculate the numerical figures X' and Y'.

At step 28 (S28), a change is made by the read address changing circuit 18, image data is read out from the frame memory 10 based on the addresses RA' (orthogonal coordinates (X', Y')) validated or invalidated by the density adjusting circuit 16, and an explosion effect is given to the image.

The image data processing apparatus 1 of the present invention may be configured so as to give to the image the explosion effect and the effect of imparting changes in the pixel density to the image.

The function values etc. showing the above embodiment are illustrated.

In addition to the above embodiment, the image data processing apparatus of the present invention may be configured in many ways as shown as modifications.

Further, in the present invention, by using the frame memory 10 and controlling the read addresses from the frame memory 10, an effect is obtained of lightening the image, but the present invention is not limited to this. It is also possible not to output part of the pixel data using a switch etc.

What is claimed is:

1. The image processing apparatus for adding a special effect to a received image represented by a plurality of pixel data, comprising:

function data generating means for generating function data for each pixel data in accordance with respective positions of said pixel data in the image;

random number generating means for generating a respective random number for each said pixel data; and determining means for determining, based on the respective function data and the respective random number, if each said pixel data is either valid or invalid, for outputting a second respective position corresponding to the respective position of said respective pixel data when it is valid, and for outputting another position not corresponding to the respective position of said respective pixel data when it is invalid;

wherein said determining means includes:
   storage means for storing image data; and
   read address generating means for generating respective read addresses for reading out each of the valid image data stored in the storage means, and for generating an address corresponding to a location in said storage means to which the image data are not stored for each said invalid pixel data so that the invalid pixel data is prevented from being output.

2. An image data processing apparatus for adding a special effect to an input image data, comprising:

storage means for temporarily storing said image data;

write address generating means for generating sequential write address signals for writing the input image data to said storage means;

read address generating means for generating sequential read address signals;

read address changing means for changing the read address signals generated by the read address generating means to produce changed read address signals; and density adjustment means for producing adjusted read address signals from said changed read address signals and for reading the input image data from the storage means in accordance with the adjusted read address signals, said density adjustment means including:
   function data generating means for generating respective function data for each read address signal in accordance with a position represented by said read address signal in the image data;

random number generating means for generating a respective random number for each read address signal; and determining means for determining, based on said respective function data and said respective random number, if a corresponding changed read address is either valid or invalid, and supplying the same changed read address when it is valid as said adjusted read address signal to said storage means so that only stored image data corresponding to valid changed read addresses are read out.

3. The image data processing apparatus as defined in claim 1, wherein said determining means determines that a changed read address is either valid or invalid in accordance with the relative magnitudes of the respective function data and the respective random number.

4. The image data processing apparatus as defined in claim 1, wherein said determining means supplies a fixed address having a predetermined fixed value when the changed read address is invalid.

5. The image data processing apparatus as defined in claim 1, wherein said read address changing means includes random number generating means for generating respective second random numbers for each of said read address signals and for changing the read address signals in accordance with said second random numbers.

6. The image data processing apparatus as defined in claim 1, wherein said determining means determines that a changed read address is invalid when the respective random number is greater than the respective function data.

* * * * *